(12) United States Patent
Tarte et al.

(10) Patent No.: US 9,254,750 B2
(45) Date of Patent: Feb. 9, 2016

(54) GRAPHICAL DISPLAY WITH SCROLLABLE GRAPHICAL ELEMENTS

(75) Inventors: Christopher Tarte, Roanoke, TX (US); Shawn Brewer, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 361 days.

(21) Appl. No.: 12/711,016

(22) Filed: Feb. 23, 2010

(65) Prior Publication Data

US 2011/0209092 A1 Aug. 25, 2011

(51) Int. Cl.
*G06F 3/048* (2013.01)
*B60K 35/00* (2006.01)
*B60K 37/02* (2006.01)
*B60K 37/06* (2006.01)

(52) U.S. Cl.
CPC .......... *B60K 35/00* (2013.01); *B60K 37/02* (2013.01); *B60K 37/06* (2013.01); *B60K 2350/1064* (2013.01); *B60K 2350/1072* (2013.01); *B60K 2350/1096* (2013.01); *B60K 2350/906* (2013.01); *B60K 2350/908* (2013.01)

(58) Field of Classification Search
CPC ............ G06F 3/04812; B60K 2350/00; B60K 2350/10; B60K 2350/1004; B60K 2350/102; B60K 2350/1024; B60K 35/00
USPC ................................. 715/830, 774
See application file for complete search history.

(56) References Cited

U.S. PATENT DOCUMENTS

| | | | |
|---|---|---|---|
| 4,072,924 A | 2/1978 | Pomerantz | |
| 4,287,503 A | 9/1981 | Sumida | |
| 4,621,306 A | 11/1986 | Sell | |
| 4,787,039 A | 11/1988 | Murata | |
| 4,787,040 A | 11/1988 | Ames | |
| 4,809,177 A | 2/1989 | Windle | |
| 5,241,295 A | 8/1993 | Madau | |
| 5,347,260 A | 9/1994 | Ginzel | |
| 5,371,487 A | 12/1994 | Hoffman | |
| 5,453,939 A | 9/1995 | Hoffman | |

(Continued)

FOREIGN PATENT DOCUMENTS

JP 2005-67406 A 3/2005

OTHER PUBLICATIONS

Office Action mailed Dec. 9, 2011, in U.S. Appl. No. 12/711,076, filed Feb. 23, 2010, 27 pages.

(Continued)

*Primary Examiner* — Omar Abdul-Ali
(74) *Attorney, Agent, or Firm* — Christensen O'Connor Johnson Kindness PLLC

(57) ABSTRACT

Aspects of the disclosed subject matter are directed to a graphical display that efficiently conveys information to a vehicle operator. In accordance with one embodiment, a method is provided that presents scrollable graphical elements on a shared screen area. More specifically, the method includes assigning a priority level to scrollable graphical elements that convey vehicle readings on the graphical display. Then, the one or more scrollable graphical elements are rendered on the graphical display at locations that change locations periodically. When an abnormal vehicle reading is identified, the method dynamically assigns an enhanced priority level to the scrollable graphical element that is configured to convey the abnormal vehicle reading. If the scrollable graphical element is currently assigned an off-screen location, the method causes the scrollable graphical element to be rendered.

22 Claims, 5 Drawing Sheets

(56) References Cited

U.S. PATENT DOCUMENTS

| | | | |
|---|---|---|---|
| 5,555,502 | A | 9/1996 | Opel |
| 5,757,268 | A | 5/1998 | Toffolo |
| 5,764,139 | A | 6/1998 | Nojima |
| 5,949,346 | A | 9/1999 | Suzuki |
| 5,982,352 | A | 11/1999 | Pryor |
| 6,008,800 | A | 12/1999 | Pryor |
| 6,009,355 | A | 12/1999 | Obradovich |
| 6,119,060 | A | 9/2000 | Takayama |
| 6,289,332 | B2 | 9/2001 | Menig |
| 6,429,845 | B1 | 8/2002 | Unseld |
| 6,434,450 | B1 | 8/2002 | Griffin, Jr. |
| 6,564,112 | B1 | 5/2003 | Factor |
| 6,667,726 | B1 | 12/2003 | Damiani |
| 6,693,523 | B1 | 2/2004 | Abel |
| 6,788,196 | B2 | 9/2004 | Ueda |
| 6,812,942 | B2 | 11/2004 | Ribak |
| 6,819,056 | B2 | 11/2004 | Lin |
| 6,870,469 | B2 | 3/2005 | Ueda |
| 6,874,012 | B1 | 3/2005 | St. Pierre |
| 6,959,223 | B2 | 10/2005 | Ogasawara |
| 6,972,665 | B2 | 12/2005 | Wang |
| 6,990,922 | B2 | 1/2006 | Ichikawa |
| 7,009,504 | B1 | 3/2006 | Banter |
| 7,015,891 | B2 | 3/2006 | Lo |
| 7,084,859 | B1 | 8/2006 | Pryor |
| 7,310,071 | B2 | 12/2007 | Cuprys |
| 7,499,778 | B2 | 3/2009 | Obradovich |
| 7,609,152 | B2 | 10/2009 | Crowe |
| 7,642,901 | B2 | 1/2010 | Kato |
| 7,683,771 | B1 | 3/2010 | Loeb |
| 7,730,401 | B2 | 6/2010 | Gillespie |
| 8,125,346 | B2 | 2/2012 | Ballard |
| 2001/0012976 | A1 | 8/2001 | Menig |
| 2004/0140948 | A1 | 7/2004 | Cuprys |
| 2004/0200923 | A1 | 10/2004 | Lee |
| 2004/0207334 | A1 | 10/2004 | Lin |
| 2004/0212579 | A1 | 10/2004 | Lo |
| 2005/0177287 | A1 | 8/2005 | Wang |
| 2006/0036335 | A1 | 2/2006 | Banter |
| 2006/0218051 | A1 | 9/2006 | Westberg |
| 2006/0274213 | A1 | 12/2006 | Saier |
| 2007/0063980 | A1 | 3/2007 | Eich |
| 2007/0069880 | A1 | 3/2007 | Best |
| 2007/0101290 | A1 * | 5/2007 | Nakashima et al. ........... 715/797 |
| 2007/0132572 | A1 | 6/2007 | Itoh |
| 2008/0122799 | A1 | 5/2008 | Pryor |
| 2008/0129684 | A1 | 6/2008 | Adams |
| 2008/0129707 | A1 | 6/2008 | Pryor |
| 2008/0133133 | A1 | 6/2008 | Abels |
| 2008/0192024 | A1 | 8/2008 | Mita |
| 2008/0211652 | A1 | 9/2008 | Cope |
| 2008/0238838 | A1 | 10/2008 | Cunningham |
| 2008/0244460 | A1 * | 10/2008 | Louch ........................... 715/856 |
| 2009/0112389 | A1 | 4/2009 | Yamamoto |
| 2009/0174533 | A1 | 7/2009 | Bowden |
| 2009/0174682 | A1 | 7/2009 | Bowden |
| 2009/0300548 | A1 * | 12/2009 | Sullivan et al. ............... 715/830 |
| 2011/0175754 | A1 | 7/2011 | Karpinsky |

OTHER PUBLICATIONS

Office Action mailed Jul. 13, 2012, in U.S. Appl. No. 12/711,090, filed Feb. 23, 2010, 11 pages.
Office Action mailed Oct. 16, 2012, in U.S. Appl. No. 12/711,013, filed Feb. 23, 2010, 15 pages.
Notice of Allowance mailed Apr. 2, 2013, in U.S. Appl. No. 12/711,013, filed Feb. 23, 2010, 8 pages.
Office Action mailed Mar. 4, 2013, in U.S. Appl. No. 12/711,054, filed Feb. 23, 2010, 24 pages.
Notice of Allowance mailed Mar. 21, 2013, in U.S. Appl. No. 12/711,090, filed Feb. 23, 2010, 9 pages.
Final Office Action Dated May 9, 2014, in U.S. Appl. No. 14/054,737, filed Oct. 15, 2013, 40 pages.
Office Action dated Jun. 19, 2014, in in U.S. Appl. No. 12/711,076, filed Feb. 23, 2010, 34 pages.
"Microsoft Windows User Experience: Official Guidelines for User Interface Developers and Designers," © 1999 Microsoft Press, Redmond, Wash., pp. 52, 53, 122-124, 135, 207, 209-215, 222, 242-247, and 250.
Office Action dated Jan. 14, 2014, in U.S. Appl. No. 14/054,737, filed Oct. 15, 2013, 19 pages.
Final Office Action mailed Sep. 12, 2012, in U.S. Appl. No. 12/711,076, filed Feb. 23, 2010, 30 pages.
Restriction Requirement mailed Mar. 23, 2012, in U.S. Appl. No. 12/711,054, filed Feb. 23, 2010, 8 pages.
Office Action mailed Apr. 26, 2012, in U.S. Appl. No. 12/711,054, filed Feb. 23, 2010, 17 pages.
Final Office Action mailed Sep. 26, 2012, in U.S. Appl. No. 12/711,054, filed Feb. 23, 2010, 15 pages.

* cited by examiner

GRAPHICAL DISPLAY WITH SCROLLABLE GRAPHICAL ELEMENTS

BACKGROUND

Increasingly, electronic components are being relied upon to facilitate the operation of a vehicle. These electronic components aid in the development of sophisticated vehicle systems such as collision detection systems, automated cruise control systems, global positioning navigation, and the like. In this regard, systems have been developed that allow electronic components to communicate in accordance with standard protocols. For example, a sensor, which may have been developed by an engine manufacturer, may encapsulate and transmit data in accordance with a standard protocol. A cab-mounted electronic control unit developed by a different entity may receive and process the received data. Since standard communication protocols exist, components from different manufacturers are able to communicate so that readings may be presented to a vehicle operator.

A graphical display within an interior surface of a vehicle is provided to convey information to a vehicle operator. With the continued development of sophisticated vehicle systems, increasing amounts of information about vehicle conditions should be accessible to a vehicle operator. However, limitations in display area size may preclude the display of some readings that describe all vehicle conditions.

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

Aspects of the disclosed subject matter are directed to a graphical display that efficiently conveys information to a vehicle operator. In accordance with one embodiment, a method is provided that presents scrollable graphical elements on a shared screen area. More specifically, the method includes assigning a priority level to scrollable graphical elements that convey vehicle readings on the graphical display. Then, the one or more scrollable graphical elements are rendered on the graphical display at locations that change locations periodically. When an abnormal vehicle reading is identified, the method dynamically assigns an enhanced priority level to the scrollable graphical element that is configured to convey the abnormal vehicle reading. If the scrollable graphical element is currently assigned an off-screen location, the method causes the scrollable graphical element to be rendered.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Prior to discussing the details of the graphical display with scrollable graphical elements, it should be understood that the following description is presented largely in terms of logic and operations that may be performed by conventional components. These components, which may be grouped in a single location or distributed over a wide area, generally include processors, memory, storage devices, display panels, input devices, etc. In circumstances where the components are distributed, the components are accessible to each other via communication links. In the following description, numerous specific details are set forth in order to provide a description of the graphical display with scrollable graphical elements. It will be apparent to one skilled in the art, however, that the disclosed subject matter may be practiced without some or all of the specific details.

Figure 1:
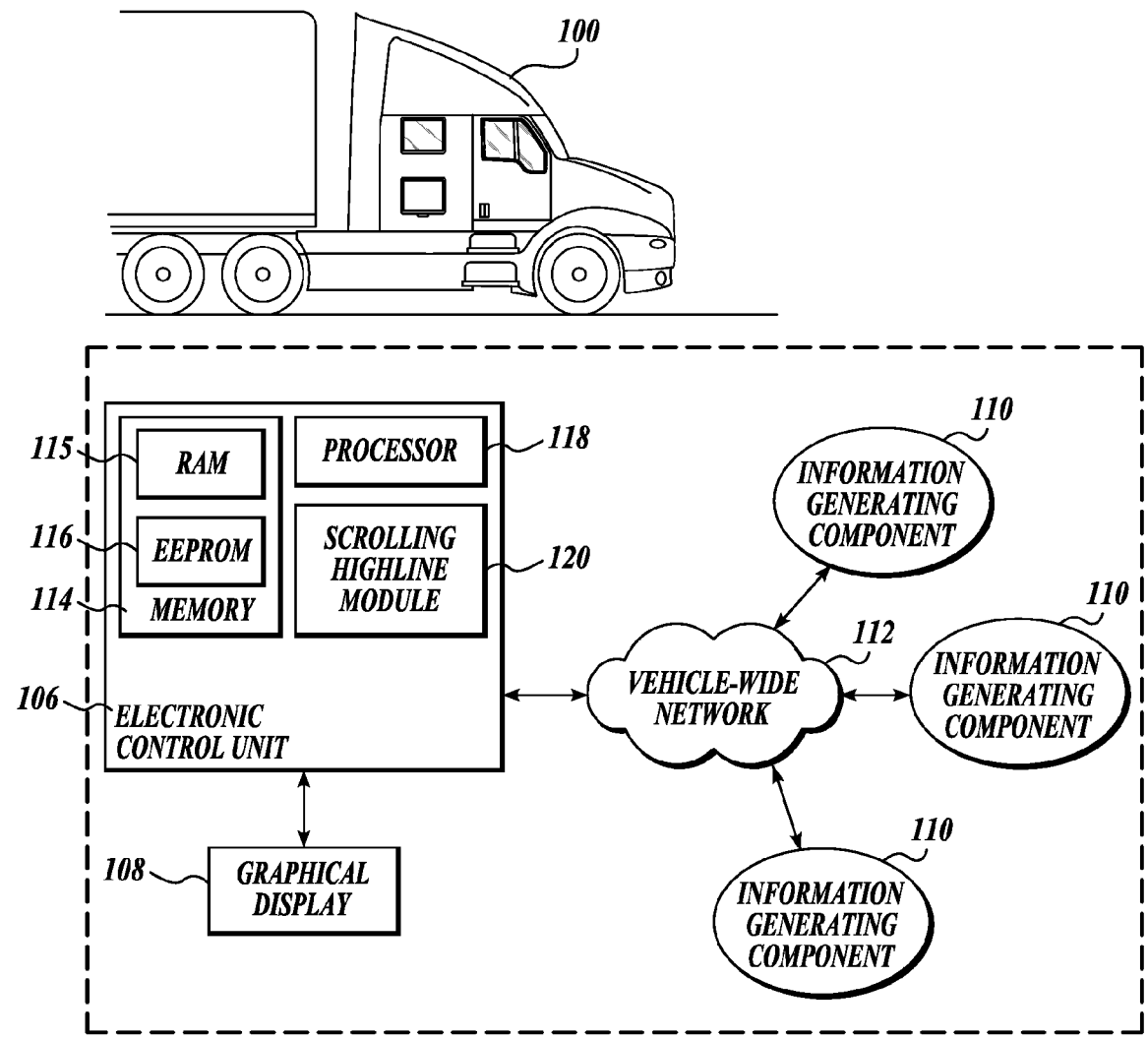
FIG. 1 is a pictorial depiction of an exemplary system architecture that illustrates components suitable for implementing aspects of the disclosed subject matter.

FIG. 1 and the following discussion is intended to provide a brief, general description of a system architecture in a truck 100 for implementing aspects of the disclosed subject matter. In the example depicted in FIG. 1, the truck 100 includes an electronic control unit 106 that is associated with a graphical display 108. As described in further detail below, the graphical display 108 is used to present information to a vehicle operator. In addition, the electronic control unit 106 is communicatively connected to a set of information generating components 110 via the vehicle-wide network 112. One of ordinary skill in the art will appreciate that the system architecture of the truck 100 will include many more components than those depicted in FIG. 1. However, it is not necessary that all of these generally conventional components be shown or described. Moreover, while FIG. 1 depicts a truck 100, another type of "vehicle" such as a car, boat, Recreational Vehicle ("RV"), vessel, etc., may be used to implement aspects of the present disclosure.

As further illustrated in FIG. 1, the electronic control unit 106 may communicate with the information generating components 110 over the vehicle-wide network 112. Those skilled in the art and others will recognize that the vehicle-wide network 112 may be implemented using any number of different communication systems, such as the Society of Automotive Engineers' (SAE) J1939 standard. However, the disclosed subject matter may be implemented using other types of currently existing or yet-to-be-developed communication systems without departing from the scope of the claimed subject matter. For example, the information generating components 110 may be connected to the electronic control unit 106 using other electrical and/or mechanical communication systems.

In the illustrative embodiment depicted in FIG. 1, the truck 100 includes an electronic control unit 106. In one embodiment, the electronic control unit 106 serves as an in-vehicle computing device for managing the collection and dissemination of information. The electronic control unit 106 may collect information over the vehicle-wide network 112 from the information generating components 110. The collected information may be processed so that the appropriate readings may be presented on the graphical display 108. In this regard and by way of example only, the information generating components 110 may report information about a number of vehicle systems including but not limited to fuel levels, tire pressure monitoring, battery level, injection systems, transmission and engine temperatures, collision detection systems, hybrid drives, heating/cooling systems, among others.

In the illustrative embodiment depicted in FIG. 1, the electronic control unit 106 includes a memory 114 with a random access memory ("RAM") 115 and an electronically erasable, programmable, read-only memory ("EEPROM") 116, a processor 118, and a scrolling display module 120. Those skilled in the art and others will recognize that the EEPROM 116 may be a nonvolatile memory capable of storing data even through interruptions in the availability of power. Conversely, the RAM 115 may be a volatile form of memory that stores program instructions for direct access by the processor 118. Typically, a fetch-and-execute cycle in which instructions are sequentially "fetched" from the RAM 115 and executed by the processor 118 is performed. In this regard, the processor 118 is configured to operate in accordance with executable instructions that are available from the RAM 115.

As further illustrated in FIG. 1, the memory 114 includes a scrolling display module 120 that implements logic for efficiently presenting information on the graphical display 108. In particular, the scrolling display module 120 causes scrollable graphical elements that convey a variety of vehicle readings to be displayed on a rotating "virtual wheel." The locations in which graphical elements are displayed may change periodically or a vehicle operator may use an input device to cause a desired graphical element to be displayed. Additional aspects of the scrolling display module 120 are described in further detail below.

As will be appreciated by those skilled in the art and others, FIG. 1 provides an example of one system architecture for implementing aspects of the present disclosure. In other embodiments, the functions and features of the truck 100 may be implemented using other components. For example, while FIG. 1 depicts an electronic control unit 106 that uses an EEPROM 116 for nonvolatile memory storage, those skilled in the art and others will recognize that other types of memory may be used. Thus, FIG. 1 depicts one component architecture for practicing the present disclosure, but other component architectures may be used without departing from the scope of the claimed subject matter.

Now, with reference to FIGS. 2A-2E, a representative section of graphical display 108 (FIG. 2) that may be used to illustrate aspects of the present disclosure will be described. The graphical display 108 may present different types of "graphical elements" to a vehicle operator. These graphical elements may be comprised of various objects used to convey information including, but not limited to, text, icons, images, animations, and combinations thereof. While some of the graphical elements may be presented at fixed locations, other graphical elements are configured to be selectively displayed on a shared screen space. The selective display of "scrollable" graphical elements increases the amount of information that can be made available to a vehicle operator.

Figure 2A:
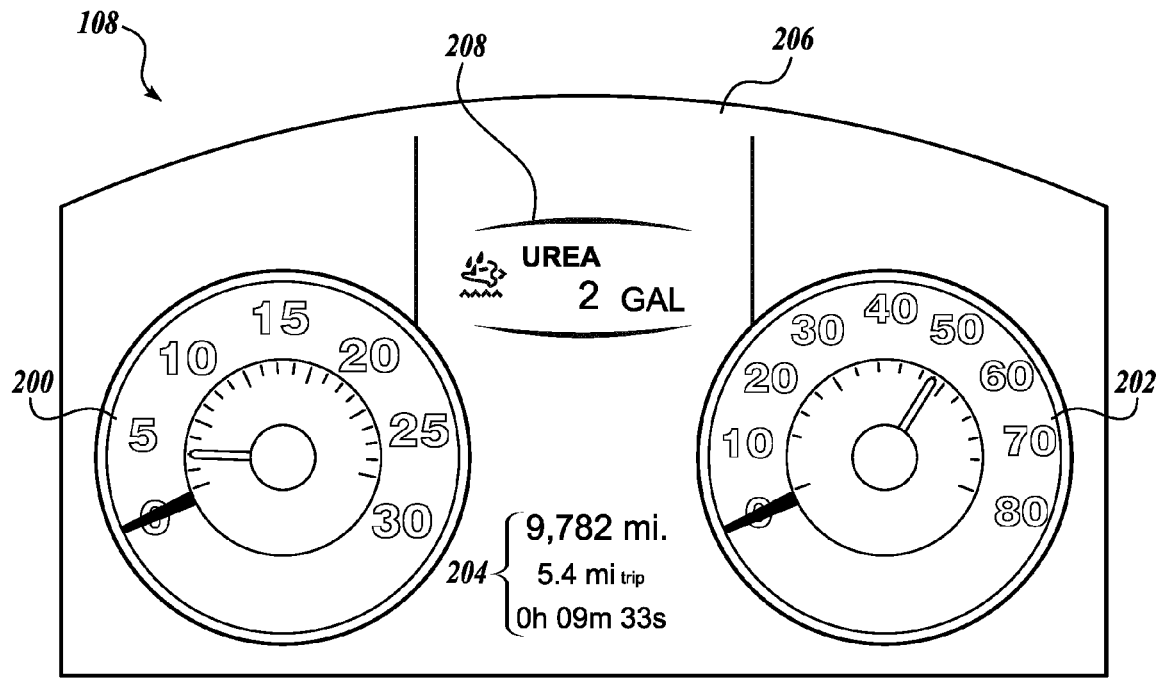
FIGS. 2A-2E are exemplary user interfaces depicting aspects of a graphical display in accordance with additional embodiments of the disclosed subject matter.

In the exemplary embodiment depicted in FIG. 2A, the graphical elements presented on the graphical display 108 includes the tachometer 200, speedometer 202, and the trip description element 204. As known to those skilled in the art, the tachometer 200 and speedometer 202 may present information to convey the engine and vehicle speed, respectively, to a vehicle operator. For example, engine and vehicle speed information may be collected by the electronic control unit 106 from an information generating component 110. The collected data is processed so that the appropriate readings may be presented on both the tachometer 200 and speedometer 202. In a similar way, data may be collected and processed in order to present readings for the other graphical elements presented of the graphical display 108.

In the exemplary embodiment depicted in FIG. 2A, the graphical display 108 includes a shared screen area 206 on which a "UREA" graphical element 208 that conveys information about the quantity of fuel available to the fuel injection system is rendered. The "UREA" graphical element 208 includes an icon, a text-based description, and a text-based reading. In this embodiment, the tachometer 200, the speedometer 202, and the trip description element 204 are continually displayed at fixed locations on the graphical display 108. By contrast, scrollable graphical elements such as the "UREA" graphical element 208, are selectively displayed at potentially multiple locations on the shared screen area 206. As described in further detail below, a plurality of scrollable graphical elements may be presented on the shared screen area 206 in a way that improves the utilization of screen space.

Figure 2B:
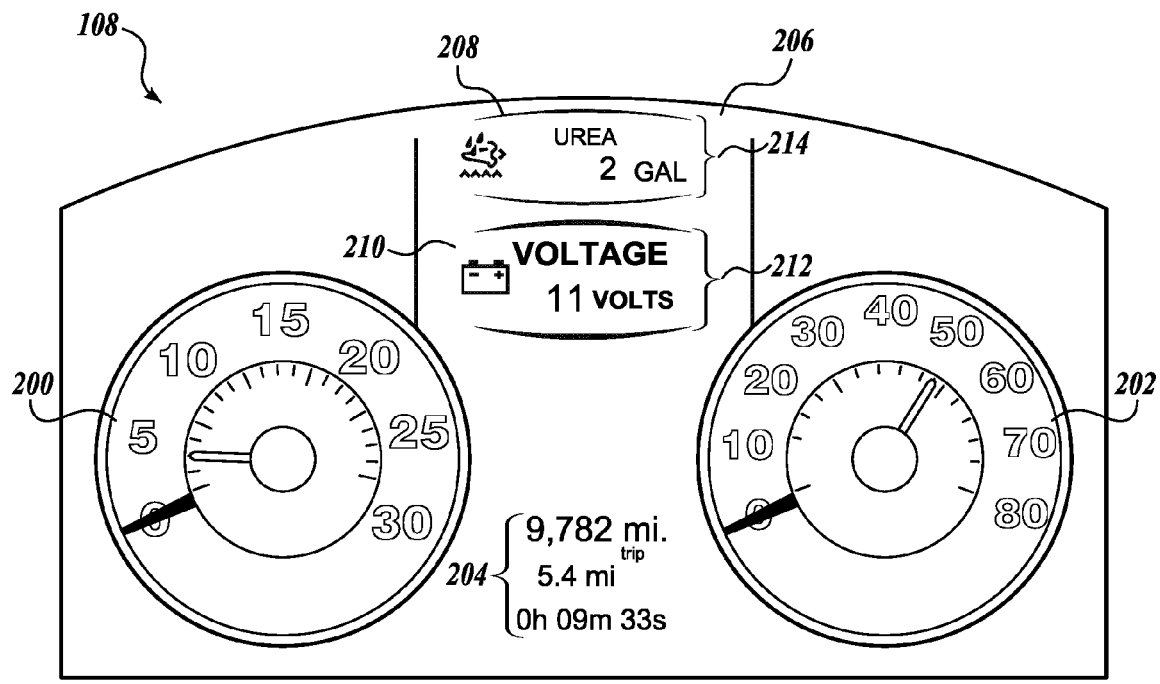
Figure 2C:
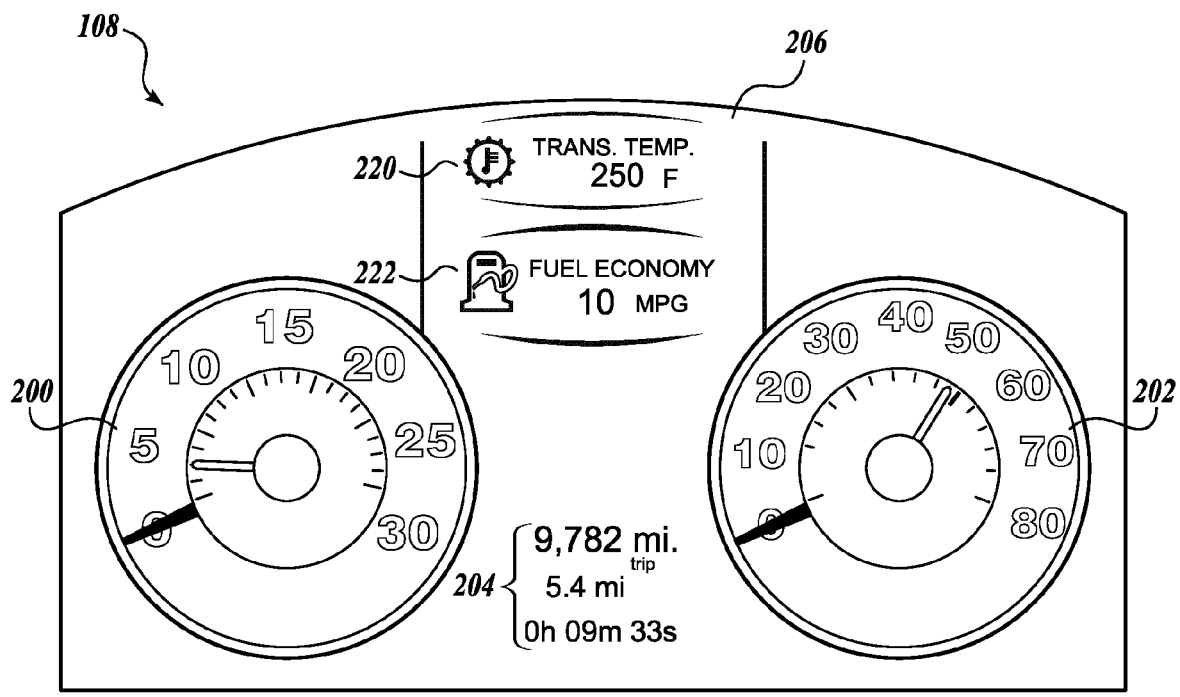

FIG. 2B includes the graphical display 108 that was described above with reference to FIG. 2A. Similar to the description provided above, the graphical display 108 depicted in FIG. 2B includes the tachometer 200, speedometer 202, trip description element 204, and the "UREA" graphical element 208. However, an animated transition is represented in FIG. 2B in which scrollable graphical elements are transitioning to different locations. In particular, both the "UREA" graphical element 208 and the "VOLTAGE" graphical element 210 are presented on the shared screen area 206 during the animated transition. In normal operation, a graphical element may be rendered at a central location 212 on the shared screen area 206 for a predetermined period of time (i.e., two seconds). Then, a transition may occur in which the first graphical element (i.e., the "UREA" graphical element 208) transitions from the central location 212 toward a secondary location 214. A second graphical element (i.e., the "VOLTAGE" graphical element 210) can be presented concurrently as moving from an "off-screen" location toward the central location 212. During the transition, the scrollable graphical element displayed as transitioning toward the secondary location 214 may be depicted in a reduced size and/or opacity. Then, upon completing the animated transition, the first graphical element (i.e., the "UREA" graphical element 208) is associated with an "off-screen" location that is not rendered. However, the second graphical element (i.e., the "VOLTAGE" graphical element 210) is then presented on the shared screen area 206 for the predetermined period of time (i.e., two seconds). During normal operation, the scrollable graphical elements associated with the scrolling display module 120 (FIG. 1) may be selectively displayed on the shared screen area 206 in this way.

Figure 2D:
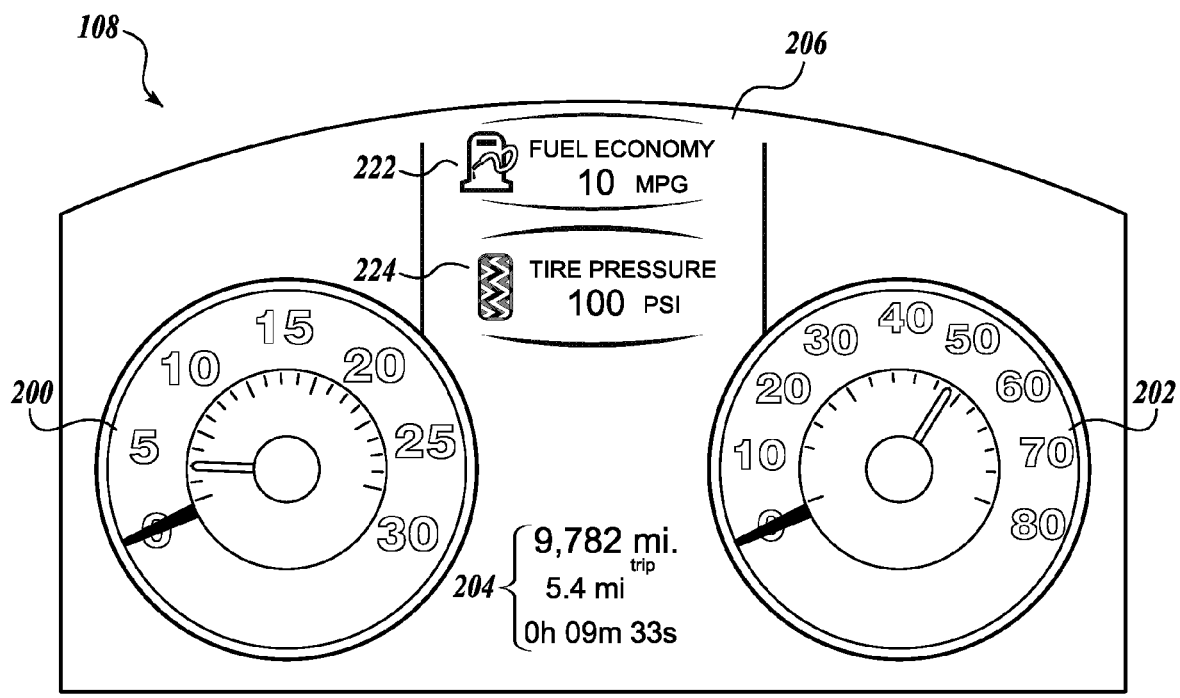

FIGS. 2A-2B provide an example in which one scrollable graphical element is presented on the shared screen area 206 for a predetermined period of time before a transition occurs. In another embodiment, two or more scrollable graphical elements are displayed on the shared screen area 206 at positions that rotate upon the occurrence of a transition. In the example depicted in FIG. 2C, the graphical display 108 includes the same fixed graphical elements 200-204 as described above with reference to FIGS. 2A-2B. However, a plurality of scrollable graphical elements that rotate to different locations are rendered on the shared screen area 206. In this example, the "TRANS. TEMP." graphical element 220 and the "FUEL ECONOMY" graphical element 222 are concurrently displayed on the shared screen area 206. When a transition occurs, the transition causes the scrollable graphical elements 220-222 to move to a different location on a "virtual wheel." In this regard, FIG. 2D provides an example of the configuration of the graphical display 108 after a transition to the scrollable graphical elements 220-222 depicted in FIG. 2C. Upon completing the transition, the "TRANS. TEMP." graphical element 220 is assigned to an "off-screen" location. The "FUEL ECONOMY" graphical element 222 moves and is displayed at a location previously used to display the "TRANS. TEMP." graphical element 220. A new scrollable graphical element (i.e., the "TIRE PRESSURE" graphical element 224) transitions from an off-screen location and is rendered at the location previously occupied by the "FUEL ECONOMY" graphical element 222.

In one embodiment, the locations in which the graphical elements are rendered on the shared screen area 206 transition after a predetermined period of time. In addition or alternatively, a vehicle operator may activate a hardware-based control to scroll through and access desired readings. For example, a revolving hardware wheel (not illustrated) may be provided within the console of the vehicle. The vehicle operator may rotate the hardware-based wheel in order to cause corresponding transitions to the graphical elements that are displayed on the shared screen area 206. Those skilled in the art and others will recognize that other types of controls may be used to obtain user input without departing from the scope of the claimed subject matter.

Figure 2E:
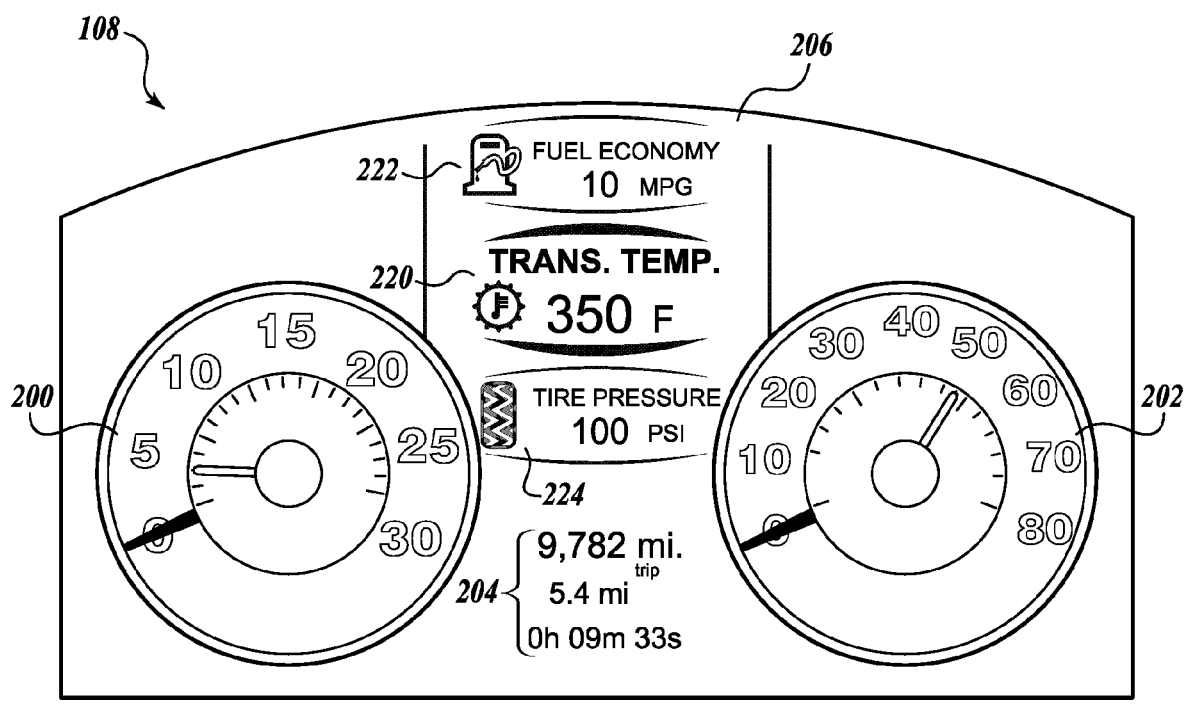

Now with reference to FIG. 2E, additional aspects of the graphical display 108 also depicted in FIGS. 2A-2D will be described. Similar to the description provided above with reference to FIGS. 2A-2D, the graphical display 108 depicted in FIG. 2E includes the fixed graphical elements 200-204. Similar to FIG. 2D, the "FUEL ECONOMY" graphical element 222 and the "TIRE PRESSURE" graphical element 224 are rendered on the shared screen area 206. In this instance, however, a scrollable graphical element that provides information about an abnormal vehicle condition is also rendered on the shared screen area 206. Specifically, the "TRANS. TEMP." graphical element 220 that was previously allocated an "off-screen" location is rendered. In this example, an abnormally high transmission temperature was detected. In response, the graphical element associated with the abnormal reading (i.e., the "TRANS. TEMP." graphical element 220) is immediately displayed to notify the vehicle operator of the abnormal vehicle condition. A graphical element that conveys information about the abnormal vehicle condition may be assigned a priority so that the graphical element is displayed in a way to attract the attention of the vehicle operator. In the example depicted in FIG. 2E, the "TRANS. TEMP." graphical element 220 may be displayed at a central location on the shared screen area 206. In addition or alternatively, the graphical element 220 may be displayed with increased size, in a color indicative of an abnormal or warning condition (e.g., yellow, red, etc.) and/or flashing in one or more colors, etc.

While specific configurations of the graphical display 108 have been described above with reference to FIGS. 2A-2E, those skilled in the art and others will recognize that the features of the disclosed subject matter may be configured in other ways. For example, graphical elements that convey information about specific vehicle conditions are described with reference to FIGS. 2A-2E. However, aspects of the disclosed subject matter may be used to convey information about other types of vehicle conditions. Accordingly, the examples provided above with reference to FIGS. 2A-2E should be construed as exemplary.

Now with reference to FIG. 3, a flow diagram that depicts one exemplary embodiment of a display method 300 formed in accordance with the disclosed subject matter will be described. In one embodiment, the display method 300 may be implemented by the scrolling display module 120 in the electronic control unit 106 (FIG. 1). Accordingly, data may be collected from a plurality of information generating components 110 so that the appropriate readings may be presented on the graphical display 108, as described above.

Figure 3:
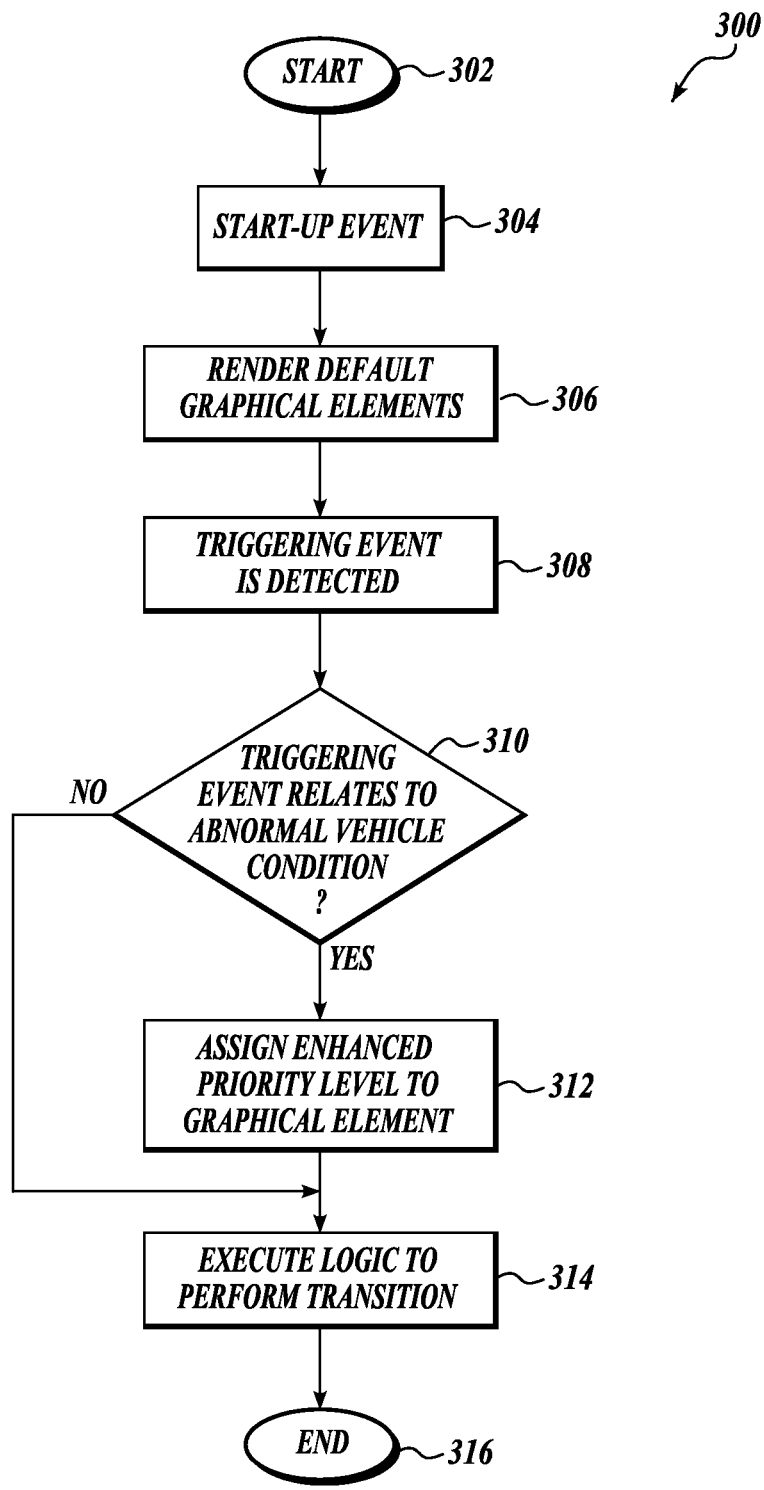
FIG. 3 is a flow diagram of a display method for rendering scrollable graphical elements on a graphical display in accordance with additional embodiments of the disclosed subject matter.

As illustrated in FIG. 3, the display method 300 begins at block 302, and at block 304, a start-up event occurs that will cause graphics to be rendered on the graphical display 108. Generally described, a start-up event is an event type that will cause the graphical display 108 to transition from an inactive state to an active state. By way of example only, the start-up event that occurs at block 304 may be the ignition of the vehicle's engine, which results in power being supplied to an ignition bus. Also, the graphical display 108 may be put to "sleep" in a reduced power state when the vehicle is inactive for a predetermined period of time. Thus, the start-up event may be another type of event, such as the return of the graphical display 108 from a reduced power state.

As further illustrated in FIG. 3, the display method 300 renders a set of default graphical elements on the graphical display 108, at block 306. The graphical elements that are rendered may be defined in default settings and be similar to the graphical elements depicted in FIGS. 2A-2E. In conjunction with rendering the default graphical elements, the electronic control unit 106 begins collecting data from the information generating components 110. This data may be continually collected and processed so that current readings may be conveyed on the graphical display 108. As described in further detail below, each graphical element that may be rendered on the graphical display 108 is assigned a priority level that can dynamically change based on vehicle conditions. When readings are within normal operating parameters, a corresponding graphical element may be assigned a default priority level. However, a graphical element may be reassigned an enhanced priority level if an abnormal condition is detected. This aspect of the present disclosure is described in further detail below.

The graphical elements rendered, at block 306, include at least one scrollable graphical element that is selectively displayed as described above with reference to FIGS. 2A-2E. In this regard, application settings identify the scrollable graphical elements to selectively display on the shared screen area 206. These settings can be configured/re-configured without having to modify the configuration of any hardware associated with the graphical display 108. Accordingly, an entity, such as a fleet owner or user, may set and modify the configuration of the graphical display 108 including which scrollable graphical elements are selectively displayed.

At block 308 of the display method 300, a triggering event is detected that will instigate a change in how scrollable graphical elements are rendered. As described above with reference to FIGS. 2A-2E, a number of different triggering events may be defined. During normal operations, the scrollable graphical elements are depicted at locations on the shared screen area 206 that change or rotate periodically. In this instance, a triggering event is generated periodically to cause the scrollable graphical elements to transition to a new location. However, other types of triggering events may interrupt the periodic rotation of scrollable graphical elements. For example, a triggering event is also generated when an abnormal vehicle condition is detected so that a corresponding graphical element may be displayed.

At decision block 310 of the display method 300, a test is performed to determine whether the triggering event, detected at block 308, relates to an abnormal vehicle condition. To determine whether an abnormal vehicle condition exists, data collected by the electronic control unit 106 may be compared to a set of data that define normal operating parameters. For example, a component or vehicle manufacture may establish normal operating parameters for various components and systems. These parameters may be compared to actual readings being reported by the information generating components 110. In instances when an actual reading is outside a normal range, the result of the test performed at block 310 is "Yes." In this instance, when an abnormal vehicle condition is the triggering event, the display method 300 proceeds to block 312. In contrast, if the triggering event relates to the periodic rotation of scrollable graphical elements, then the result of the test performed at block 310 is "No." In this instance, the display method 300 proceeds to block 314, described in further detail below.

At block 312 of the display method 300, a scrollable graphical element associated with the abnormal vehicle condition is assigned an enhanced priority level. The priority levels assigned may depend on which vehicle component or system experienced the abnormal vehicle condition. In addition, the priority level assigned may depend on the extent in which a reading diverges from normal parameters. For example, the detection of a transmission temperature that diverges substantially from a normal reading may be assigned an enhanced priority level that is indicative of a critical condition. A tire pressure reading that diverges a small amount from normal parameters may be assigned an enhanced priority level that is lower than a high transmission temperature. Moreover, a manufacturer, fleet operator, and/or user may define which priority levels will be assigned to various abnormal vehicle conditions. In any event, upon detection of an abnormal vehicle condition, a scrollable graphical element associated with the abnormal condition is assigned an enhanced priority level at block 312.

At block 314 of the display method 300, logic for implementing a transition to the rendering of scrollable graphical elements is executed. In one type of transition, scrollable graphical elements are moved to successive locations on a "virtual" wheel. In this instance, the scrollable graphical elements are depicted at a particular location for a predetermined period of time (i.e., two seconds). Then, a transition occurs in which one or more of the scrollable graphical elements move to the next successive location. This type of transition will typically result in at least one scrollable graphical element transitioning to an "off-screen" location. Moreover, at least one scrollable graphical element that was not previously displayed is moved to an "on-screen" location.

In another embodiment, the transition performed at block 314 involves displaying a scrollable graphical element to convey information about an abnormal vehicle condition. In the example described above with reference to FIG. 2E, logic for implementing the transition involves causing a scrollable graphical element (i.e., the "TRANS. TEMP." graphical element 220) that was previously allocated an "off-screen" location to be displayed. In other instances, logic for implementing the transition executed at block 316 involves changing the position of a scrollable graphical element that is currently displayed. For example, upon the detection of an abnormal vehicle condition, a scrollable graphical element that is currently displayed may be moved to a more prominent location.

The logic for implementing a transition executed at block 314 may involve setting/changing the visual attributes of a scrollable graphical element. The visual attributes of a scrollable graphical element may be based on an assigned priority level. For example, if a scrollable graphical element (i.e., "TRANS. TEMP." graphical element 220) is associated with an enhanced priority level that is critical, it may be displayed in a first color (i.e., red) to provide a strong visual indicator of the critical condition. On the other hand, if the condition is less critical but still abnormal, the scrollable graphical element may be displayed in a second color (e.g., yellow) to provide a warning to the vehicle operator. Moreover, logic for implementing the transition executed at block 314 may affect the visual attributes of scrollable graphical elements in other ways. For example, upon detection of an abnormal vehicle condition, the transition may change other visual attributes (i.e., size, contrast ratio, flashing, opacity, etc.) of a scrollable graphical element. Then, once the logic for implementing the transition is executed, the display method 300 proceeds to block 316, where it terminates.

It should be well understood that the display method 300 described above with reference to FIG. 3 does not show all of the functions performed when rendering the graphical elements on a graphical display. Instead, the display method 300 describes exemplary embodiments of the disclosed subject matter. Those skilled in the art and others will recognize that some functions may be performed in a different order, omitted/added, or otherwise varied without departing from the scope of the claimed subject matter.

While illustrative embodiments have been illustrated and described, it will be appreciated that various changes can be made therein without departing from the spirit and scope of the disclosed subject matter.

The invention claimed is:

1. A computer system having modules for presenting information to a vehicle operator via a graphical display, the computer system comprising:
   a graphical display;
   one or more processors;
   a prioritization module configured to cause one or more of the processors to:
      assign a default priority level to graphical elements that convey readings via a user interface; and
      dynamically assign an enhanced priority level to a corresponding scrollable graphical element based on an identified abnormal vehicle condition; and
   a scrolling display module configured to cause one or more of the processors to:
      in a first display state, cause a set of scrollable graphical elements that display vehicle readings to be displayed on a virtual wheel at regular intervals on the graphical display, wherein, during the regular intervals, one of the vehicle readings is displayed for a predetermined period of time followed by partial rotation of the virtual wheel to another of the vehicle readings, wherein the one of the vehicle readings is stationary during display for the predetermined period of time; and
      in a second display state, cause the corresponding scrollable graphical element to be rendered on a shared screen area of the graphical display responsive to the enhanced priority level and independent of the regular intervals.

2. The computer system as recited in claim 1, wherein the scrolling display module is further configured to cause the corresponding scrollable graphical element to be rendered at a central location on the shared screen area.

3. The computer system as recited in claim 1, wherein the corresponding scrollable graphical element assigned the enhanced priority level is rendered with at least one of the following visual attributes: an increased size, a color indicative of an abnormal condition, and flashing.

4. The computer system as recited in claim 1, wherein the scrollable graphical elements are rendered at successive locations along the virtual wheel.

5. The computer system as recited in claim 1, wherein the priority levels assigned to the scrollable graphical elements are configurable and may be modified on demand.

6. The computer system as recited in claim 1, wherein a value of the enhanced priority level assigned to the corresponding scrollable graphical element depends on which vehicle system experienced the abnormal vehicle condition or the extent to which a reading diverges from normal parameters.

7. The computer system as recited in claim 1, wherein the partial rotations of the virtual wheel comprise an animated transition in which a first scrollable graphical element is visually depicted as moving to an off-screen location and a second scrollable graphical element is visually depicted as moving to an on-screen location.

8. A computer-implemented method for displaying information on a graphical display, the method comprising:
assigning a priority level to scrollable graphical elements associated with vehicle readings;
assigning locations on a virtual wheel to the scrollable graphical elements;
in a first display state, rotating locations of the scrollable graphical elements on the virtual wheel at regular intervals, wherein the regular intervals comprise display of one of the graphical elements for a predetermined period of time followed by partial rotation of the virtual wheel to another graphical element, wherein the one of the vehicle readings is stationary during display for the predetermined period of time, wherein at least one scrollable graphical element is temporarily assigned an off-screen location that is not rendered on a shared screen area;
dynamically assigning an enhanced priority level to a scrollable graphical element that corresponds to an abnormal reading; and
switching to an abnormal vehicle condition display state responsive to the abnormal reading, wherein the switching comprises causing the scrollable graphical element that corresponds to the abnormal reading to be rendered on the shared screen area in response to a triggering event that interrupts the periodically rotating locations of the scrollable graphical elements on the virtual wheel.

9. The method as recited in claim 8, further comprising causing the scrollable graphical element that corresponds to the abnormal reading to be rendered at a central location on the shared screen area.

10. The method as recited in claim 8, wherein the scrollable graphical element that corresponds to the abnormal reading is rendered with at least one of the following visual attributes: an increased size, a color indicative of an abnormal condition, and flashing.

11. The method as recited in claim 8, wherein a value of the enhanced priority level depends on which vehicle system is associated with the abnormal reading or the extent to which the abnormal reading diverges from normal parameters.

12. The method as recited in claim 8, wherein the priority levels are defined in application-based settings that may be modified on demand.

13. The method as recited in claim 8, wherein the scrollable graphical elements are rendered at successive locations along the virtual wheel.

14. The method as recited in claim 8, further comprising rotating the scrollable graphical elements based on a corresponding rotation in a hardware-based wheel.

15. The method as recited in claim 8, wherein the rotating comprises performing an animated transition in which a first scrollable graphical element is visually depicted as moving to an off-screen location and a second scrollable graphical element is visually depicted as moving to an on-screen location.

16. The method as recited in claim 8, wherein the scrollable graphical elements are initially rendered at successive locations along the virtual wheel, the method further comprising, in the abnormal vehicle condition display state, changing a relative location along the virtual wheel of the scrollable graphical element that corresponds to the abnormal reading compared to other scrollable graphical elements on the virtual wheel.

17. The method as recited in claim 16, wherein changing the relative location along the virtual wheel comprises inserting the scrollable graphical element that corresponds to the abnormal reading between two adjacent scrollable graphical elements on the virtual wheel.

18. The method as recited in claim 8, wherein causing the scrollable graphical element that corresponds to the abnormal reading to be rendered on the shared screen area comprises adding the scrollable graphical element that corresponds to the abnormal reading to the shared screen area such that more scrollable graphical elements are rendered on the shared screen area than in the first display state.

19. A system for conveying information to a vehicle operator, comprising:
a graphical display;
one or more processors; and
a memory having stored therein a scrolling display module comprising program instructions configured to, when executed, cause one or more of the processors to:
render one or more scrollable graphical elements that convey vehicle readings on a virtual wheel for display at locations that change periodically at regular intervals, wherein the regular intervals comprise display of one of the vehicle readings for a predetermined period of time followed by partial rotation of the virtual wheel to another of the vehicle readings, wherein the one of the vehicle readings is stationary during display for the predetermined period of time;
transition a first scrollable graphical element previously associated with an off-screen location to an on-screen location in a shared screen area; and
transition a second scrollable graphical element to an off-screen location.

20. The system as recited in claim 19, further comprising a hardware-based wheel user input device.

21. The system as recited in claim 16, wherein the program instructions are further configured to, when executed, cause one or more of the processors to render a scrollable graphical element that corresponds to an abnormal vehicle reading on the shared screen area.

22. The system as recited in claim 21, wherein the scrollable graphical element that corresponds to the abnormal vehicle reading comprises at least one of the following visual attributes: an increased size, a color indicative of an abnormal condition, and flashing.

* * * * *